Feb. 13, 1934.  C. A. CLAUSS  1,947,124
INSERT FOR WAFFLE IRONS
Filed July 30, 1932

INVENTOR
*Charles A. Clauss.*
BY
*H. G. Manning*
ATTORNEY

Patented Feb. 13, 1934

1,947,124

UNITED STATES PATENT OFFICE 1,947,124

INSERT FOR WAFFLE IRON

Charles A. Clauss, Fairfield, Conn.

Application July 30, 1932. Serial No. 636,877

4 Claims. (Cl. 53—10)

This invention relates to cooking utensils, and more particularly to an insert or filler adapted to be placed within the two cooperating hinged sections of a waffle iron for the purpose of producing waffles of unique and unusual forms.

One object of this invention is to provide a device of the above nature conforming in part to the interior surfaces of the waffle iron, but having apertures therethrough shaped to correspond to the outlines of the waffles which it is desired to produce.

A further object is to provide a device of the above nature which will be simple in construction, inexpensive to manufacture, easy to install and manipulate, ornamental in appearance and very efficient and durable in use.

With these and other objects in view there has been illustrated in the accompanying drawing one form in which the invention may conveniently be embodied in practice.

In the preparation of menus for afternoon teas, "bridges", children's parties and the like, it is a common custom to provide interesting and attractive novelties in the form of cakes, cookies and similar delicacies shaped to represent figures and designs, such as flowers, birds, etc., or the indicia of playing cards. These are readily produced by the use of cutter dies or molds which are simple in construction and inexpensive to obtain.

Waffles, however, because of the special cooking apparatus required, and the relatively high cost of providing this apparatus in the required variety of special forms, have not heretofore been adapted to production in special shapes or in any form other than that corresponding to the conventional waffle iron. The present invention overcomes the above and other disadvantages by the provision of a special insert member or filler whereby waffles of any desired shapes may be readily made in a conventional waffle iron.

Figure 1:
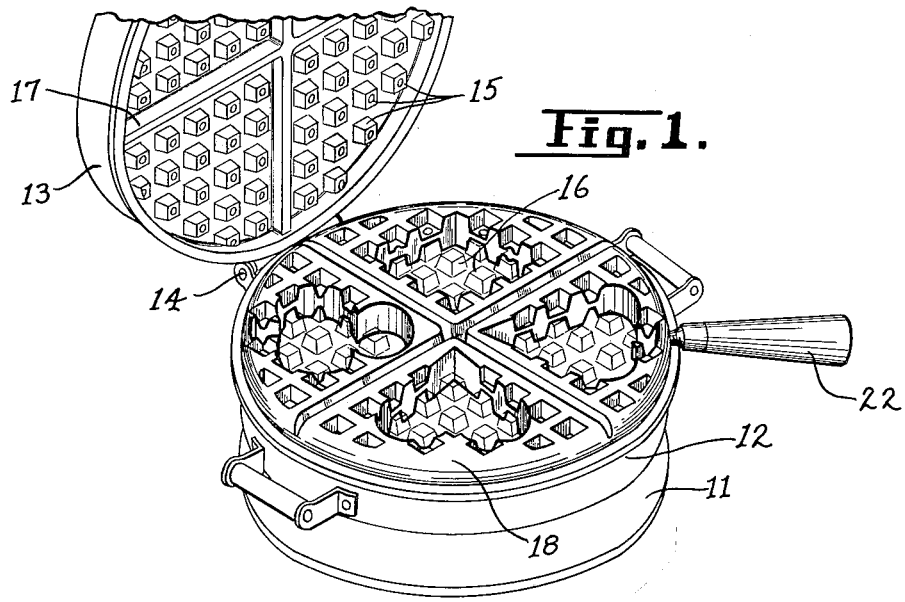
Fig. 1 is a perspective view of a waffle iron of the conventional type, showing the novel insert or filler placed therein.
Figure 2:
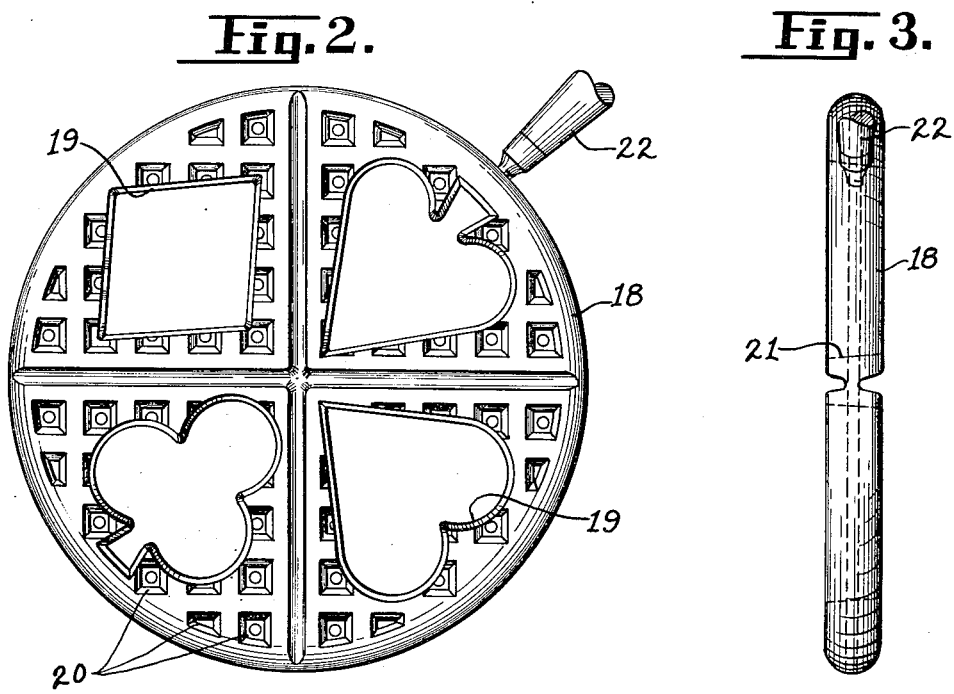
Fig. 2 is a top view of the novel insert.

Referring now to the drawing, in which like reference numbers denote corresponding parts throughout the several views, there is shown in Fig. 1, a waffle iron of the conventional type, having a supporting base 11, a stationary lower leaf 12 and a movable upper leaf 13, said leaves 12 and 13 being hinged together at 14 and adapted to swing open at a wide angle, giving unobstructed access to the inner surfaces of both leaves. Each of the leaves 12 and 13 has its inner surface provided with a plurality of bosses or studs 15 and 16, adapted to conduct heat into the interior of the dough or batter being cooked therebetween. In addition to the studs 15, each leaf is provided with two or more diametrical ribs 17 adapted partially to separate the contents of the waffle iron into more or less definite portions, which may easily be broken apart.

An insert or filler member 18 is made in the form of a metal plate having a plurality of relatively large apertures 19 extending therethrough, and is adapted to fit closely within the waffle iron when the leaves are closed together. The outer surfaces of the insert plate are provided with indentations 20, adapted to fit the studs and ribs on the inner surfaces of the leaves 12 and 13, and said insert plate has substantially the same dimensions as a waffle cooked in the waffle iron.

Figure 3:
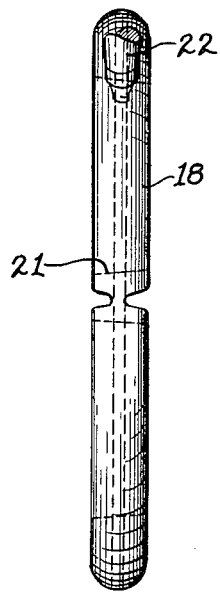
Fig. 3 is an edgewise view of the same.

The apertures 19 of the insert are herein shown as representing the emblems: "clubs", "diamonds", "hearts" and "spades" employed in ordinary playing cards, and said apertures are given a slight taper or "draw" as indicated at 21 in Fig. 3, so that the small cooked waffles contained therein may be removed without difficulty. The plate is provided with a handle 22 to permit it to be readily inserted in and removed from the waffle iron without difficulty or inconvenience.

Operation

In the use of this invention, the insert 18 will be positioned in the lower leaf 12 of the waffle iron with its depressions fitting the projections on the inner surface of said leaf. Both leaves 12 and 13 of the waffle iron will then be heated to the proper cooking temperature. A small quantity of prepared batter will next be placed in each of the contoured apertures 19, whereupon the leaves will be closed together and the cooking carried out in the ordinary manner. Upon opening the leaves of the waffle iron, the waffles will be found to have become conformed to the contours of the several apertures 19, from which, owing to the tapered construction shown at 21, they may readily be extracted. It will be understood that the insert 18 may be readily removed at any time, restoring the waffle iron to its normal state and permitting the making of waffles of the ordinary shape and size.

While there has been disclosed in this specification one form in which the invention may be embodied, it is to be understood that this form is shown for the purposes of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a cooking utensil, a perforated insert shaped to fit closely between the leaves of a waffle iron, the perforations having contours corresponding to the outlines which it is desired to impart to finished waffles, said perforations being tapered to permit the waffles to be easily removed.

2. In a cooking utensil, an insert adapted to be placed within a waffle iron and having upon its surfaces indentations corresponding to the projections upon the interior surfaces of said waffle iron, and adapted to fit closely thereto, said insert having also apertures extending therethrough with contours corresponding to the outlines which it is desired to impart to finished waffles.

3. In a cooking utensil, a waffle iron having a pair of hinged leaves and a removable insert plate shaped to fit between said leaves and occupy certain portions and to leave unoccupied certain other portions of the interior of the same, thereby providing cooking spaces for small waffles of predetermined contours.

4. In a cooking utensil, a perforated insert shaped to fit closely between the leaves of a waffle iron, the perforations having contours corresponding to the emblems of a pack of playing cards, said perforations being tapered to permit the waffles to be easily removed.

CHARLES A. CLAUSS.